(12) United States Patent
Kodama

(10) Patent No.: US 7,516,073 B2
(45) Date of Patent: Apr. 7, 2009

(54) ELECTRONIC-BOOK READ-ALOUD DEVICE AND ELECTRONIC-BOOK READ-ALOUD METHOD

(75) Inventor: Satoshi Kodama, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 580 days.

(21) Appl. No.: 11/191,164

(22) Filed: Jul. 27, 2005

(65) Prior Publication Data

US 2006/0047504 A1 Mar. 2, 2006

(30) Foreign Application Priority Data

Aug. 11, 2004 (JP) ............................. 2004-234545

(51) Int. Cl.
| | |
|---|---|
| G10L 13/02 | (2006.01) |
| G10L 13/08 | (2006.01) |
| G06F 17/28 | (2006.01) |
| G09B 5/06 | (2006.01) |
| G06F 17/20 | (2006.01) |
| G06F 17/21 | (2006.01) |
| G10L 11/00 | (2006.01) |
| G10L 21/00 | (2006.01) |
| G09B 5/00 | (2006.01) |

(52) U.S. Cl. ........................... 704/270; 704/7; 704/258; 704/260; 434/309; 715/241

(58) Field of Classification Search ................. 704/200, 704/246, 258, 260; 434/317; 455/556.1, 455/569.2; 705/26; 707/1, 100, 102, 104.1; 709/219; 715/230, 727

See application file for complete search history.

(56) References Cited

U.S. PATENT DOCUMENTS 5,697,793 A 12/1997 Huffman et al. ............ 434/317

(Continued)

FOREIGN PATENT DOCUMENTS

| WO | WO 87/01481 | * | 8/1986 |
| WO | WO 9722110 A1 | * | 6/1997 |
| WO | WO 0101313 A2 | * | 1/2001 |

OTHER PUBLICATIONS

Pobiak, B.C., "Adjustable Access Electronic Books", Proceedings of the Johns Hopkins National Search for Computing Applications to Assist Persons with Disabilities, 1992., Feb. 1-5, 1992, 90-94.*

Fabrizi et al., "Electronic Book Interfaces for Blind and Partially Sighted People", IEE Colloquium on Human-Computer Interface Design for Multimedia Electronic Books, Feb. 22, 1995, 7/1-7/5.*

*Primary Examiner*—Talivaldis I Smits
*Assistant Examiner*—David Kovacek
(74) *Attorney, Agent, or Firm*—Brinks Hofer Gilson & Lione

(57) ABSTRACT

A control unit of an electronic-book read-aloud device reads book data and electronic-book data from an electronic bookmark and stores the read data in a storage unit. Further, the control unit sets a read-aloud-start position based on the electronic-bookmark data, reads the book data after the read-aloud-start position from the storage unit, and transmits the book data to a speech-output unit. The speech-output unit converts the book data into a speech signal and transmits the speech signal to a speaker through an amplifier. If the read-aloud processing is stopped, the control unit writes read-aloud-end-position data and read-aloud-date data into the electronic bookmark of the electronic book.

9 Claims, 4 Drawing Sheets

U.S. PATENT DOCUMENTS

| | | | | |
|---|---|---|---|---|
| 5,761,485 A * | 6/1998 | Munyan | ............... | 715/839 |
| 6,502,022 B1 * | 12/2002 | Chastain et al. | ............... | 701/36 |
| 2002/0184189 A1 * | 12/2002 | Hay et al. | ............... | 707/1 |
| 2003/0187954 A1 * | 10/2003 | Wen et al. | ............... | 709/219 |
| 2003/0216915 A1 * | 11/2003 | Xie | ............... | 704/246 |
| 2003/0219706 A1 * | 11/2003 | Nijim | ............... | 434/317 |
| 2004/0177131 A1 * | 9/2004 | Tomimori | ............... | 709/219 |
| 2004/0204063 A1 * | 10/2004 | Van Erlach | ............... | 455/556.1 |

* cited by examiner

ELECTRONIC-BOOK READ-ALOUD DEVICE AND ELECTRONIC-BOOK READ-ALOUD METHOD

BACKGROUND OF THE INVENTION

1. Field of the Invention

The present invention relates to an electronic-book read-aloud device configured to read data on an electronic book aloud and particularly relates to an electronic-book read-aloud device that is installed in a vehicle and that is suitable for reading an electronic book brought in the vehicle.

2. Description of the Related Art

In recent years, electronic books have become commercially practical. The electronic book includes electronic-book data such as electronic novel data. The electronic-book data is downloaded from a predetermined server by communicating over the Internet or the like. The electronic-book data is converted into text data, and a display image of the text data is produced on a screen. Further, the electronic-book data can be stored in a personal computer, a personal digital assistant (PDA), that is, a mobile information terminal, a mobile phone, and so forth so that a user can read the electronic book using the device. Hereinafter, the above-described apparatus and devices configured to convert book data into text data and produce a display image of the text data on a screen will be referred to as an "electronic book".

Usually, the electronic book has a function referred to as an electronic bookmark configured to store information about a position where the user is reading in the electronic book. For example, Japanese Unexamined Patent Application Publication No. 2001-101202 discloses an electronic book that can set the electronic bookmark on each of at least two pages and quickly display a display image of the page on which the electronic bookmark is set.

The known electronic book has been considered to be the substitute of an ordinary book. Therefore, a user reads the electronic book by using his/her own eyes, as is the case with the ordinary book. Consequently, the user cannot read the electronic book while he/she drives a vehicle, for example.

Although the electronic bookmark is set at a position where the user stopped reading, the user often forgets the contents of a page, including the stop position, with the passage of time. In that case, the user often starts reading the electronic book from a position forward of the position where the user stopped reading, which does not make full use of the electronic bookmark.

SUMMARY OF THE INVENTION

Accordingly, the present invention provides an electronic-book read-aloud device which allows a user to receive the contents of an electronic book while the user drives a vehicle and to make full use of an electronic bookmark.

An electronic-book read-aloud device according to an aspect of the present invention includes a communication unit configured to communicate with at least one electronic book, a storage unit configured to store data on the electronic book, a speech-output unit configured to receive the electronic-book data transmitted from the storage unit, convert the electronic-book data into a speech signal, and externally transmit the speech signal, and a control unit configured to control the communication unit, the storage unit, and the speech-output unit. The control unit reads the electronic-book data and the electronic-bookmark data from the electronic book through the communication unit, stores the read data in the storage unit, sets a read-aloud-start position based on the electronic-bookmark data, at the time read-aloud processing is started, and writes data on a position where the read-aloud processing is stopped and data on the date the read-aloud processing is performed into the electronic book, as the electronic-bookmark data, at the time the read-aloud processing is stopped.

Thus, the electronic-book data and the electronic-bookmark data are read from the electronic book through the communication unit and stored in the storage unit. Then, the electronic-book data stored in the storage unit is converted into the speech signal by the speech-output unit so that a user can listen with his/her own ears. Consequently, the user can receive the details of the electronic book while he/she drives a vehicle.

Further, the read-aloud-start position is set by using the electronic-bookmark data, which eliminates the user having to set the read-aloud-start position. Consequently, the convenience of the electronic-book read-aloud device increases.

An electronic-book read-aloud device according to another aspect of the present invention includes a unit configured to read and/or write data from and/or into a radio-frequency identification (RFID) tag, a communication unit configured to communicate with at least one predetermined information center, a storage unit configured to store data on an electronic book, a speech-output unit configured to receive the electronic-book data transmitted from the storage unit, convert the electronic-book data into a speech signal, and externally transmit the speech signal, and a control unit configured to control the RFID-tag read/write unit, the communication unit, the storage unit, and the speech-output unit. If an RFID tag is attached to at least one book, the control unit reads data used for specifying the book from the book to which the RFID tag is attached through the RFID-tag read/write unit, acquires data on the book from the information center through the communication unit, stores the book data in the storage unit, acquires electronic-bookmark data from at least one bookmark to which the RFID tag is attached through the RFID-tag read/write unit, sets a read-aloud-start position based on the electronic-bookmark data, at the time read-aloud processing is started, and writes data on a position where the read-aloud processing is stopped and data on the date the read-aloud processing is performed into the RFID tag of the bookmark through the RFID-tag read/write unit, as the electronic-bookmark data, at the time read-aloud processing is stopped.

Thus, in the case of the electronic-book read-aloud device of the present invention, the RFID tag (IC tag) is attached to an ordinary book and data is read from the RFID tag so that the book is specified. Then, the electronic-book read-aloud device communicates with an information center through a communication unit, acquires the book data, and stores the book data in a storage unit. Then, the book data stored in the storage unit is converted into a speech signal by a speech-output unit so that a user can listen with his/her own ears. Consequently, the user receives the details of the book while he/she drives a vehicle.

Further, the electronic-book read-aloud device uses a bookmark to which the RFID tag is attached, and electronic-bookmark data is stored in the RFID tag of the bookmark, which eliminates the user having to set the read-aloud-start position and increases the convenience of the electronic-book read-aloud device.

DESCRIPTION OF THE PREFERRED EMBODIMENTS

Embodiments of the present invention will be described with reference to the attached drawings.

First Embodiment

Figure 1:
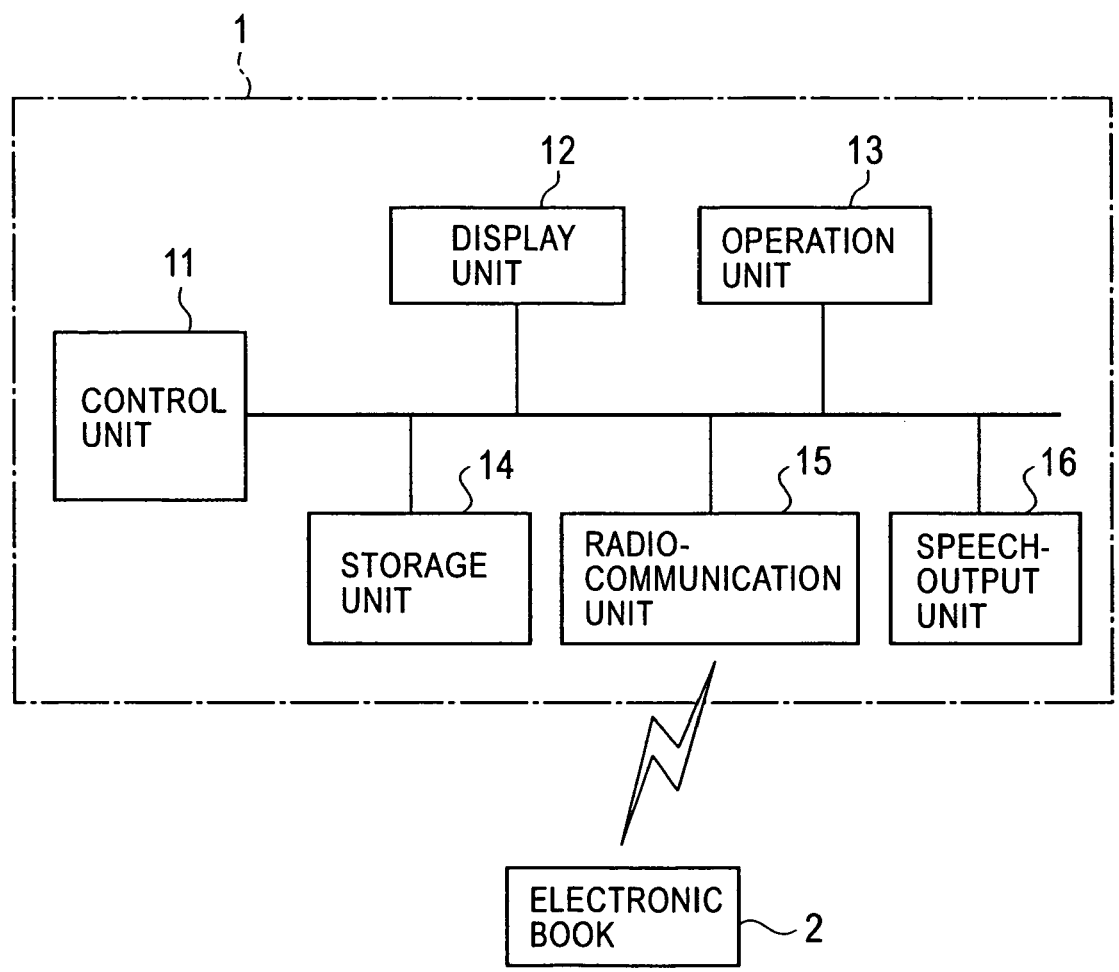
FIG. 1 is a block diagram showing the configuration of an electronic-book read-aloud device according to a first embodiment of the present invention.

FIG. 1 is a block diagram illustrating the configuration of an electronic-book read-aloud device 1 according to a first embodiment of the present invention. In the first embodiment, the electronic-book read-aloud device 1 is used as a vehicle-mounted electronic-book read-aloud device.

As shown in FIG. 1, the electronic-book read-aloud device 1 includes a control unit 11, a display unit 12, an operation unit 13, a storage unit 14, a radio-communication unit 15, and a speech-output unit 16.

The control unit 11 includes a microcomputer. The control unit 11 is connected to the display unit 12, the operation unit 13, the storage unit 14, the radio-communication unit 15, and the speech-output unit 16 through a common bus so that the control unit 11 can transmit and/or receive a signal to and/or from the display unit 12, the operation unit 13, the storage unit 14, the radio-communication unit 15, and the speech-output unit 16.

The display unit 12 includes a liquid-crystal panel or the like. The display unit 12 produces a display image of an operation screen of the electronic-book read-aloud device 1 according to a signal transmitted from the control unit 11, for example. The operation unit 13 includes various operation buttons required for operating the electronic-book read-aloud device 1. The various operation buttons include, for example, a "start read-aloud" button, a "page-up" button, a "page-down" button, a "pause" button, and a "stop read-aloud" button, and so forth.

The storage unit 14 includes a semiconductor memory. As will be described later, book data (e.g., data in a text format) read from the electronic book 2, data on an electronic bookmark, and so forth are written into the storage unit 14 by the control unit 11. The radio-communication unit 15 communicates with the electronic book 2 under the control of the control unit 11. In the first embodiment, the radio-communication unit 15 communicates with the electronic book 2 by using Bluetooth (registered trademark). The speech-output unit 16 receives the book data transmitted from the storage unit 14, converts the book data into a speech signal, and externally transmits the speech signal. The speech signal transmitted from the speech-output unit 16 is transmitted to a speaker (not shown) provided in a vehicle through an amplifier (not shown).

Figure 2:
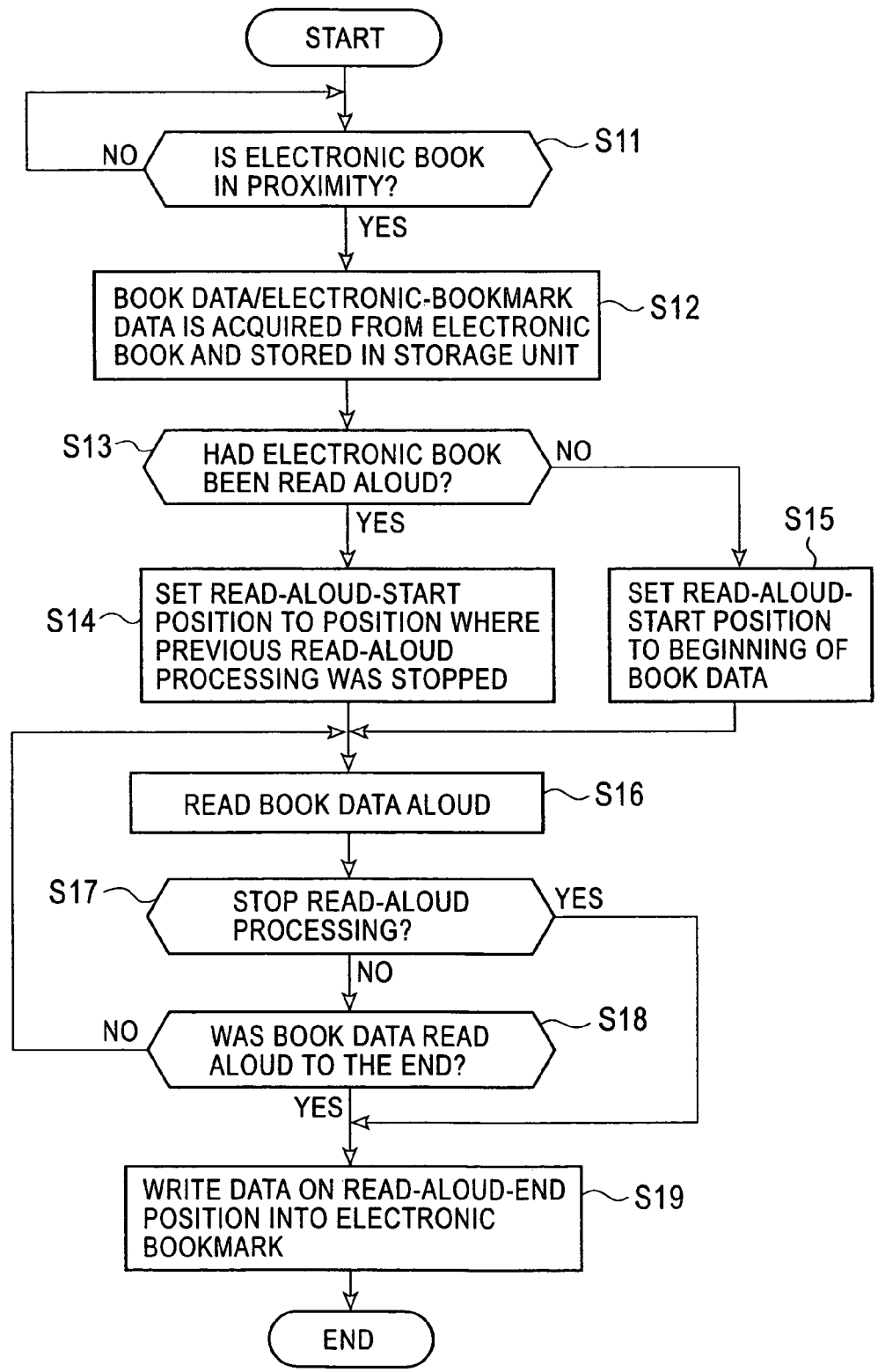
FIG. 2 is a flowchart illustrating operations performed by the electronic-book read-aloud device according to the first embodiment.

FIG. 2 is a flowchart illustrating operations performed by the electronic-book read-aloud device 1 of the first embodiment. The electronic-book read-aloud device 1 can start reading the book data aloud from a desired position according to an operation performed by a user. In this embodiment, however, the read-aloud start position is automatically set by using data on the electronic bookmark.

First, at step S11, the control unit 11 monitors whether or not the electronic book 2 is in the proximity thereof, that is, a vehicle. Namely, the control unit 11 externally transmits a communication-connection request signal at predetermined intervals through the radio-communication unit 15. If the electronic book 2 is brought into the vehicle and receives the communication-connection request signal, an answer signal is transmitted from the electronic book 2 to the electronic-book read-aloud device 1. Subsequently, the control unit 11 determines that the electronic book 2 is in the vehicle, and communicates with the electronic book 2.

Next, the processing advances to step S12 so that the control unit 11 transmits a transmission-request signal for book data (data in the text format, for example) and the electronic-bookmark data to the electronic book 2. Upon receiving the transmission-request signal transmitted from the electronic-book read-aloud device 1, the electronic book 2 transmits the book data and the electronic-bookmark data to the electronic-book read-aloud device 1. Then, the control unit 11 receives the book data and the electronic-bookmark data transmitted from the electronic book 2 and stores the transmitted data in the storage unit 14.

The processing advances to step S13 so that the control unit 11 checks the electronic-bookmark data stored in the storage unit 14 and determines whether or not the electronic book had been read aloud. If the electronic book 2 had been read aloud, the electronic bookmark includes data on the day and time the electronic book 2 was read aloud and data on the final position at which the read-aloud processing was stopped. The control unit 11 determines whether or not the electronic book 2 had been read aloud according to whether or not the above-described data exists. If the electronic book 2 had been read aloud, the processing advances to step S14. If the electronic book 2 had not been read aloud, the processing advances to step S15.

If the processing advances from step S13 to step S14, namely, if it is determined that the electronic book 2 had been read aloud, the control unit 11 sets the read-aloud-start position to the position where the previous read-aloud processing was stopped and advances the processing to step S16.

On the other hand, if the processing advances from step S13 to step S15, namely, if it is determined that the electronic book 2 had not been read aloud, the control unit 11 sets the read-aloud-start position to the beginning of the book data and advances the processing to step S16.

The control unit 11 produces the display image of a message on whether or not the read-aloud processing should be started on the display unit 12, for example, at step S16. If the user approves starting the read-aloud processing, the control unit 11 accesses the storage unit 14, reads the book data from the read-aloud-start position set at step S14 or step S15, and transmits the read book data to the speech-output unit 16. The speech-output unit 16 converts the book data transmitted thereto into speech signals in sequence and externally transmits the speech signals. The speech signals transmitted from the speech-output unit 16 are transmitted to the speaker provided in the vehicle through the amplifier, and speech reading the electronic book 2 aloud is produced from the amplifier into the vehicle. Further, while the book data is read aloud, the book data may be converted into text, and the display image of a page including the read-aloud position may be produced on the display unit 22.

Then, the control unit 11 determines whether or not the read-aloud processing should be stopped, at step S17. For example, if the user presses the "stop read-aloud" button, or turns off the power of the electronic-book read-aloud device 1 or the accessory (ACC) power of the vehicle, the processing advances to step S19. Subsequently, the control unit 11 communicates with the electronic book 2, writes data on the read-aloud date (the current date) and data on the read-aloud-end position into the electronic bookmark, and terminates the electronic-book read-aloud processing.

On the other hand, if it is determined that the read-aloud processing should not be stopped at step S17, the processing advances to step S18 so that it is determined whether or not the book data was read to the end. If it is determined that the book data was not read to the end, the processing returns to step S16 so that the read-aloud processing is continued. If it is determined that the book data was read to the end, the processing advances to step S19 so that the control unit 11 communicates with the electronic book 2, writes data on the read-aloud date (the current date) and data on the read-aloud-end position into the electronic bookmark, and terminates the electronic-book read-aloud processing.

Thus, according to the first embodiment, when the electronic book 2 is brought in the vehicle, the electronic-book read-aloud device 1 communicates with the electronic book 2, reads the book data, and starts performing the read-aloud processing. Consequently, the user can understand the details of the electronic book 2 while he/she drives the vehicle.

Further, according to the first embodiment, it is determined whether or not the electronic book 2 had been read by using the data stored in the electronic bookmark. If the electronic book 2 had been read, the read-aloud processing is started from the position where the previous read-aloud processing was stopped, which eliminates the user having to set the read-aloud-processing start position. Consequently, the convenience of the electronic-book read-aloud device 1 increases.

Further, according to the first embodiment, when the read-aloud processing is stopped, the data on the read-aloud-end position is written into the electronic bookmark. Therefore, when the user takes the electronic book 2 out of the vehicle and wants to read it on a standalone basis, the user can start reading the electronic book 2 from the position where the previous read-aloud processing was stopped.

According to the first embodiment, the electronic bookmark stores information about the date on which the previous read-aloud processing was performed, and the read-aloud processing is started from the position where the electronic bookmark is set. However, the read-aloud-start position may be adjusted according to the number of days elapsed since the date on which the previous read-aloud processing was performed. For example, the read-aloud-start position may be adjusted according to the number of days elapsed since the date on which the previous read-aloud processing was performed, as shown in the following options (1) to (3).

(1) If the previous read-aloud processing was performed today or yesterday, the read-aloud-start position is set to the beginning of a sentence including the part corresponding to a position where the previous read-aloud processing was stopped.

(2) If the previous read-aloud processing was performed from two to seven days ago, the read-aloud-start position is set to the beginning of a paragraph immediately before a paragraph including the part corresponding to the position where the previous read-aloud processing was stopped.

(3) If the previous read-aloud processing was performed at least seven days ago, the read-aloud-start position is set to the beginning of a chapter including the part corresponding to the position where the previous read-aloud processing was stopped.

Thus, the read-aloud-start position is adjusted according to the number of days elapsed since the date the previous read-aloud processing was performed. Therefore, the user can remember the part where the previous read-aloud processing was stopped, and the convenience of the electronic-book read-aloud device 1 increases.

Further, according to the first embodiment, the electronic-book read-aloud device 1 is connected to the electronic book 2 through radio communication, that is, Bluetooth (registered trademark). However, the electronic-book read-aloud device 1 may be connected to the electronic book 2 through cable communication.

Second Embodiment

Figure 3:
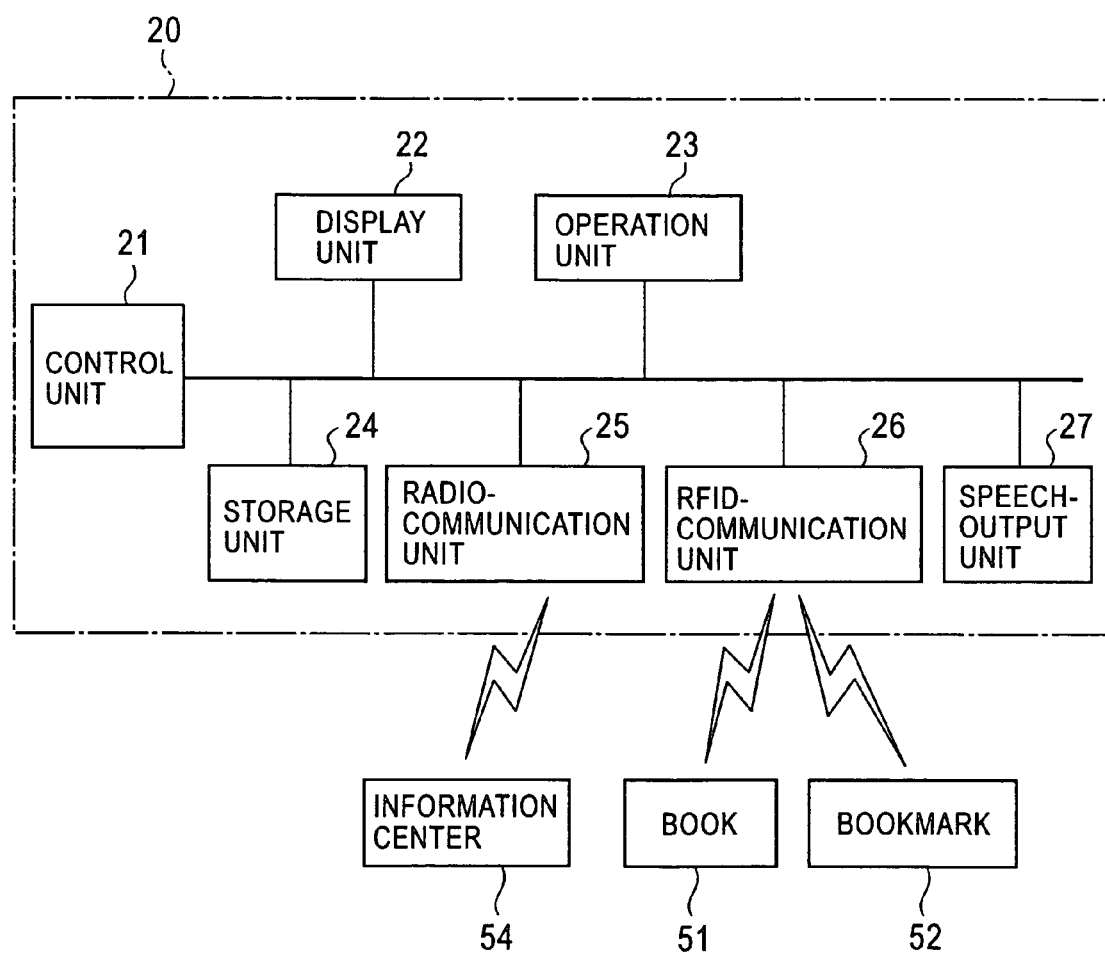
FIG. 3 is a block diagram showing the configuration of an electronic-book read-aloud device according to a second embodiment of the present invention.

FIG. 3 is a block diagram illustrating the configuration of an electronic-book read-aloud device 20 according to a second embodiment of the present invention. In this embodiment, the electronic-book read-aloud device 20 is used as the vehicle-mounted electronic-book read-aloud device, as is the case with the first embodiment.

The electronic-book read-aloud device 20 includes a control unit 21, a display unit 22, an operation unit 23, a storage unit 24, a radio-communication unit 25, an RFID-communication unit 26, and a speech-output unit 27.

The control unit 21 includes a microcomputer. The control unit 21 is connected to the display unit 22, the operation unit 23, the storage unit 24, the radio-communication unit 25, the RFID-communication unit 26, and the speech-output unit 27 through a common bus so that the control unit 21 can transmit and/or receive a signal to and/or from the display unit 22, the operation unit 23, the storage unit 24, the radio-communication unit 25, the RFID-communication unit 26, and the speech-output unit 27.

The display unit 22 includes a liquid-crystal panel or the like. The display unit 22 produces a display image of an operation screen of the electronic-book read-aloud device 20 according to a signal transmitted from the control unit 21, for example. The operation unit 23 includes various operation buttons required for operating the electronic-book read-aloud device 20. The various operation buttons include, for example, a "start read-aloud" button, a "page-up" button, a "page-down" button, a "pause" button, and a "stop read-aloud" button, and so forth.

The storage unit 24 includes a semiconductor memory. As will be described later, book data downloaded from a predetermined information center 54 and data read from an electronic bookmark 52 are written into the storage unit 24 by the control unit 21. The radio-communication unit 25 communicates with the information center 54 under the control of the control unit 21. The radio-communication unit 25 communicates with the information center 54 by using a local-area wireless network, a mobile phone, and so forth.

Under the control of the control unit 21, the RFID-communication unit 26 reads book data from an RFID tag, that is, an IC tag attached to a book (ordinary book) 51, and reads and/or writes data from and/or into an RFID tag attached to the bookmark 52.

The speech-output unit 27 converts the book data stored in the storage unit 24 into speech signals and externally transmits the speech signals. The speech signals transmitted from the speech-output unit 27 are transmitted to a speaker (not shown) provided in the vehicle through an amplifier (not shown).

Figure 4:
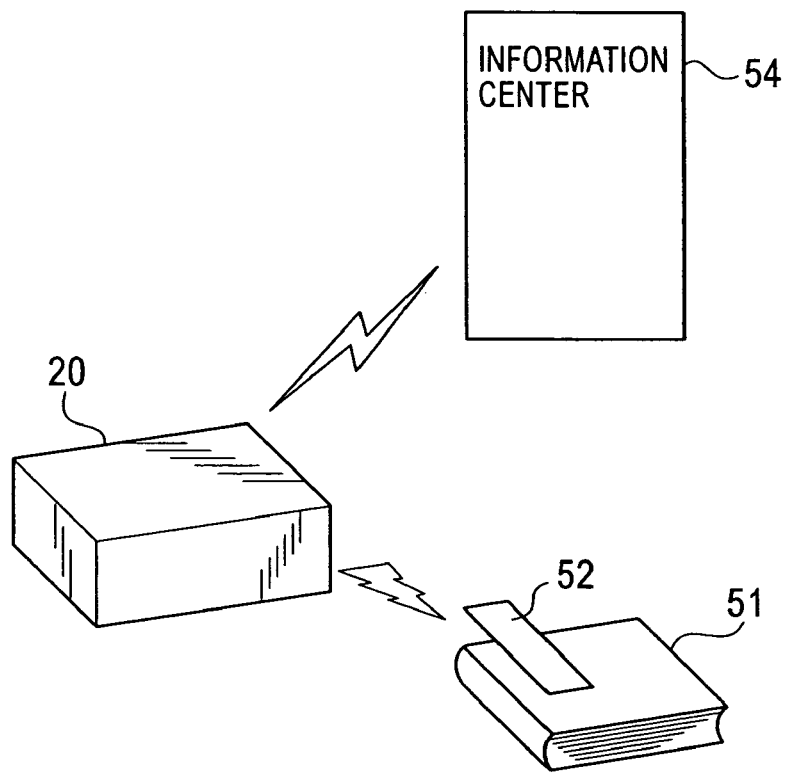
FIG. 4 is a schematic view of the electronic-book read-aloud device according to the second embodiment.
Figure 5:
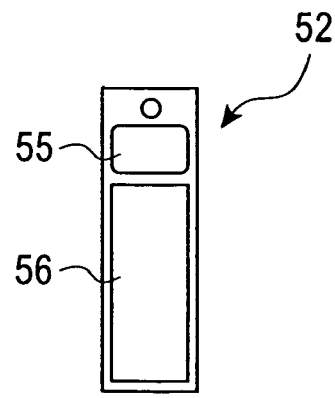
FIG. 5 is a plan view of a bookmark used in the second embodiment.

FIG. 4 schematically shows the configuration of the electronic-book read-aloud device 20. The electronic bookmark 52 is as thin as paper so that it can be inserted into the gap between pages of the book 51 the user was reading, as is the case with an ordinary bookmark. As shown in FIG. 5, the electronic bookmark 52 includes a rewritable RFID tag 55 and a display unit 56 including electronic paper. The electronic-book read-aloud device 20 writes data indicating the read-aloud-start position (the data on the electronic bookmark) into the RFID tag 55 and produces the display image of information indicating a position at which the read-aloud processing is performed on the display unit 56.

Hereinafter, operations performed by the electronic-book read-aloud device 20 will be described.

When the power of the electronic-book read-aloud device 20 is turned on, the RFID-communication unit 26 monitors whether or not the book 51 and the bookmark 52 to which the RFID tag is attached are in the proximity thereof, that is, the vehicle. If the RFID-communication unit 26 detects the book 51 and the bookmark 52, the control unit 21 reads information specifying the book, such as a book code, from the RFID tag of the book 51 and transmit a request signal for the book data corresponding to the book (data in text form, for example) to the information center 54 through the communication unit 25. Then, upon receiving the book data transmitted from the information center 54, the control unit 21 stores the book data in the storage unit 24.

Further, the control unit 21 reads the electronic-bookmark data from the electronic bookmark 52 through the RFID-communication unit 26, and determines whether or not the book had been read aloud based on the electronic-bookmark data. If the control unit 21 determines that the book had been read aloud, the read-aloud processing is started from the position at which the previous read-aloud processing was stopped, as is the case with the first embodiment. In that case, the read-aloud-start position may be adjusted according to the number of days elapsed since the date on which the previous read-aloud processing was performed. If the book had not been read aloud, the read-aloud processing is started from the beginning of the book data.

After that, when the read-aloud processing is stopped, or finished at the end of the book data, the control unit 21 writes data about the date the read-aloud processing was performed and data on the position at which the read-aloud processing was stopped or finished into the RFID tag 55 of the electronic bookmark 52 as the electronic-bookmark data, through the RFID-communication unit 26.

In the second embodiment, the information specifying a book from the RFID tag 55 attached to the ordinary book 51 and the data on the book 51 is downloaded from the information center 54. Consequently, a user who does not have an electronic book can use the electronic-book read-aloud device 20. The bookmark 52 is as thin as paper so that it can be used as an ordinary bookmark. Therefore, the electronic bookmark 52 is useful for a user who reads an ordinary book.

The RFID tag 55 of the electronic bookmark 52 may store the electronic-bookmark data corresponding to at least two books.

According to the first and second embodiments, each of the electronic-book read-aloud devices 1 and 20 is independently provided in the vehicle. However, each of the electronic-book read-aloud devices 1 and 20 may be provided in a vehicle-mounted navigation system, or another vehicle-mounted electronic device. In that case, each of the electronic-book read-aloud devices 1 and 20 is achieved by the shared use of at least some part of the hardware of the vehicle-mounted navigation system, or the vehicle-mounted electronic devices.

Although each of the electronic-book read-aloud devices 1 and 20 according to the first and second embodiments is used for the vehicle-mounted electronic-book read-aloud device, the present invention is not limited to the above-described application.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An electronic-book read-aloud device comprising:
    a communication unit configured to communicate with at least one electronic book;
    a storage unit configured to store data on the electronic book;
    a speech-output unit configured to receive the electronic-book data transmitted from the storage unit, convert the electronic-book data into a speech signal, and externally transmit the speech signal; and
    a control unit configured to control the communication unit, the storage unit, and the speech-output unit,
    wherein the control unit reads electronic-book data and electronic-bookmark data from the electronic book through the communication unit, stores the read data in the storage unit, sets a read-aloud-start position based on the electronic-bookmark data, and writes data indicating a position at which the read-aloud processing is stopped and data on the date the read-aloud processing is performed into the electronic book, as electronic-bookmark data, at the time the read-aloud processing is stopped, and
    wherein the control unit adjusts the read-aloud-start position according to the time elapsed since a date when previous read-aloud processing was performed, based on the electronic-bookmark data read from the bookmark, at the time that the read-aloud processing is started.

2. An electronic-book read-aloud device according to claim 1, wherein the communication unit communicates with the electronic book through radio communication.

3. An electronic-book read-aloud device according to claim 1, wherein the control unit adjusts the read-aloud-start position according to the number of days elapsed since a date when previous read-aloud processing was performed, based on the electronic-bookmark data, at the time that read-aloud processing is started.

4. An electronic-book read-aloud device according to claim 3, wherein if the number of days elapsed since the date when the previous read-aloud processing was performed is determined to be within a first range based on the electronic-bookmark data, at the time that the read-aloud processing is started, the control unit sets the read-aloud-start position to the beginning of a sentence including the part corresponding to a position at which the previous read-aloud processing was stopped.

5. An electronic-book read-aloud device according to claim 4, wherein if the number of days elapsed since the date when the previous read-aloud processing was performed is determined to be within a second range based on the electronic-bookmark data, at the time that the read-aloud processing is started, the control unit sets the read-aloud-start position to the beginning of a paragraph immediately before a paragraph including the part corresponding to the position at which the previous read-aloud processing was stopped.

6. An electronic-book read-aloud device according to claim 5, wherein if the number of days elapsed since the date when the previous read-aloud processing was performed is determined to be within a third range based on the electronic-bookmark data, at the time that the read-aloud processing is started, the control unit sets the read-aloud-start position to the beginning of a chapter including the part corresponding to the position at which the previous read-aloud processing was stopped.

7. An electronic-book read-aloud device comprising:
a unit configured to read and/or write data from and/or into a radio-frequency identification tag;
a communication unit configured to communicate with at least one predetermined information center;
a storage unit configured to store data on an electronic book;
a speech-output unit configured to receive the electronic-book data transmitted from the storage unit, convert the electronic-book data into a speech signal, and externally transmit the speech signal; and
a control unit configured to control the radio-frequency-identification-tag read/write unit, the communication unit, the storage unit, and the speech-output unit,
wherein if the radio-frequency-identification tag is attached to at least one book, the control unit reads data used for specifying the book from the book to which the radio-frequency-identification tag is attached through the radio-frequency-identification-tag read/write unit, acquires data on the book from the information center through the communication unit, stores the book data in the storage unit, acquires electronic-bookmark data from at least one bookmark to which the radio-frequency-identification tag is attached through the radio-frequency-identification-tag read/write unit, sets a read-aloud-start position based on the electronic-bookmark data, and writes data indicating a position at which the read-aloud processing is stopped and data indicating the date the read-aloud processing is performed into the radio-frequency-identification tag of the bookmark through the radio-frequency-identification-tag read/write unit, as electronic-bookmark data, at the time that the read-aloud processing is stopped, and
wherein the control unit adjusts the read-aloud-start position according to the time elapsed since a date when previous read-aloud processing was performed, based on the electronic-bookmark data read from the bookmark, at the time that the read-aloud processing is started.

8. A vehicle-mounted electronic-book read-aloud device comprising:
a communication unit configured to communicate with at least one electronic book;
a storage unit configured to store data on the electronic book;
a speech-output unit configured to receive the electronic-book data transmitted from the storage unit, convert the electronic-book data into a speech signal, and externally transmit the speech signal; and
a control unit configured to control the communication unit, the storage unit, and the speech-output unit,
wherein the control unit reads the electronic-book data and electronic-bookmark data from the electronic book through the communication unit, stores the read data in the storage unit, sets a read-aloud-start position based on the electronic-bookmark data, and writes data indicating a position at which the read-aloud processing is stopped and data indicating a date the read-aloud processing is performed into the electronic book, as electronic-bookmark data, at the time that an accessory power of a vehicle is turned off, and
wherein the control unit adjusts the read-aloud-start position according to the time elapsed since a date when previous read-aloud processing was performed, based on the electronic-bookmark data read from the bookmark, at the time that the read-aloud processing is started.

9. An electronic-book read-aloud method comprising:
communicating with at least one electronic book;
storing book data and electronic-bookmark data that are read from the electronic book through the communications in a storage unit;
determining whether or not the electronic book corresponding to the stored book data had been read aloud;
setting a read-aloud-start position to the beginning of the book data if it is determined that the electronic book had not been read aloud;
setting the read-aloud-start position based on the electronic-bookmark data if it is determined that the electronic book had been read aloud;
reading the book data aloud starting from the read-aloud-start position; and
automatically writing data indicating a position at which the read-aloud processing is stopped and data indicating a date the read-aloud processing is performed into the electronic book, as the electronic-bookmark data, at the time that the read-aloud processing is stopped,
wherein the read-aloud-start position is adjusted according to the time elapsed since a date when previous read-aloud processing was performed, based on the electronic-bookmark data, when setting the read-aloud-start position.

* * * * *